United States Patent [19]

Ueda et al.

[11] Patent Number: 4,854,453
[45] Date of Patent: Aug. 8, 1989

[54] ARTICLE SELECTING AND CONVEYING SYSTEM

[75] Inventors: Yutaka Ueda, Nara; Masaharu Kiriake, Kyoto, both of Japan

[73] Assignee: Murata Kikai Kabushiki Kaisha, Kyoto, Japan

[21] Appl. No.: 75,597

[22] Filed: Jul. 20, 1987

Related U.S. Application Data

[62] Division of Ser. No. 557,068, Dec. 2, 1983, Pat. No. 4,681,231.

[30] Foreign Application Priority Data

Dec. 8, 1982 [JP] Japan .................................. 57-186217
May 25, 1983 [KR] Rep. of Korea .................... 83262/83

[51] Int. Cl.$^4$ .............................................. B07C 5/36
[52] U.S. Cl. .................................... 209/583; 209/571; 209/927
[58] Field of Search ............... 209/567, 569, 583, 538, 209/540, 546, 927, 571; 198/349, 465.1, 803.01, 803.12; 242/35.5 A

[56] References Cited

U.S. PATENT DOCUMENTS

| | | | |
|---|---|---|---|
| 3,021,949 | 2/1962 | Hogg et al. | 209/927 |
| 3,563,376 | 2/1971 | Zegna | 209/53 |
| 3,854,889 | 12/1974 | Lemelson | 198/349 |
| 3,920,124 | 11/1975 | Patterson | 209/583 |
| 4,136,779 | 1/1979 | Bieringer | 209/538 |
| 4,248,389 | 2/1981 | Thompson et al. | 209/538 |
| 4,463,909 | 8/1984 | Kiriake et al. | 242/35.5 A |
| 4,598,869 | 7/1986 | Uchida et al. | 242/35.5 A |
| 4,681,231 | 7/1987 | Ueda et al. | 209/927 |
| 4,694,949 | 9/1987 | Nakagawa | 209/927 |

FOREIGN PATENT DOCUMENTS

| | | | |
|---|---|---|---|
| 0119623 | 9/1980 | Japan | 209/927 |
| 0170354 | 10/1982 | Japan | 242/35.5 A |

Primary Examiner—Robert B. Reeves
Assistant Examiner—Donald T. Hajec
Attorney, Agent, or Firm—Spensley Horn Jubas & Lubitz

[57] ABSTRACT

A cop selecting and conveying apparatus for an automatic winder in which winding units are divided into a plurality of winding sections and different kinds of cops carried on carrying mediums are transferred on the discrimination indicia is formed in either the carrying medium or the guide member at the side of the conveying discrimination indicia is disposed at a position to corresponding to the indicia.

4 Claims, 18 Drawing Sheets

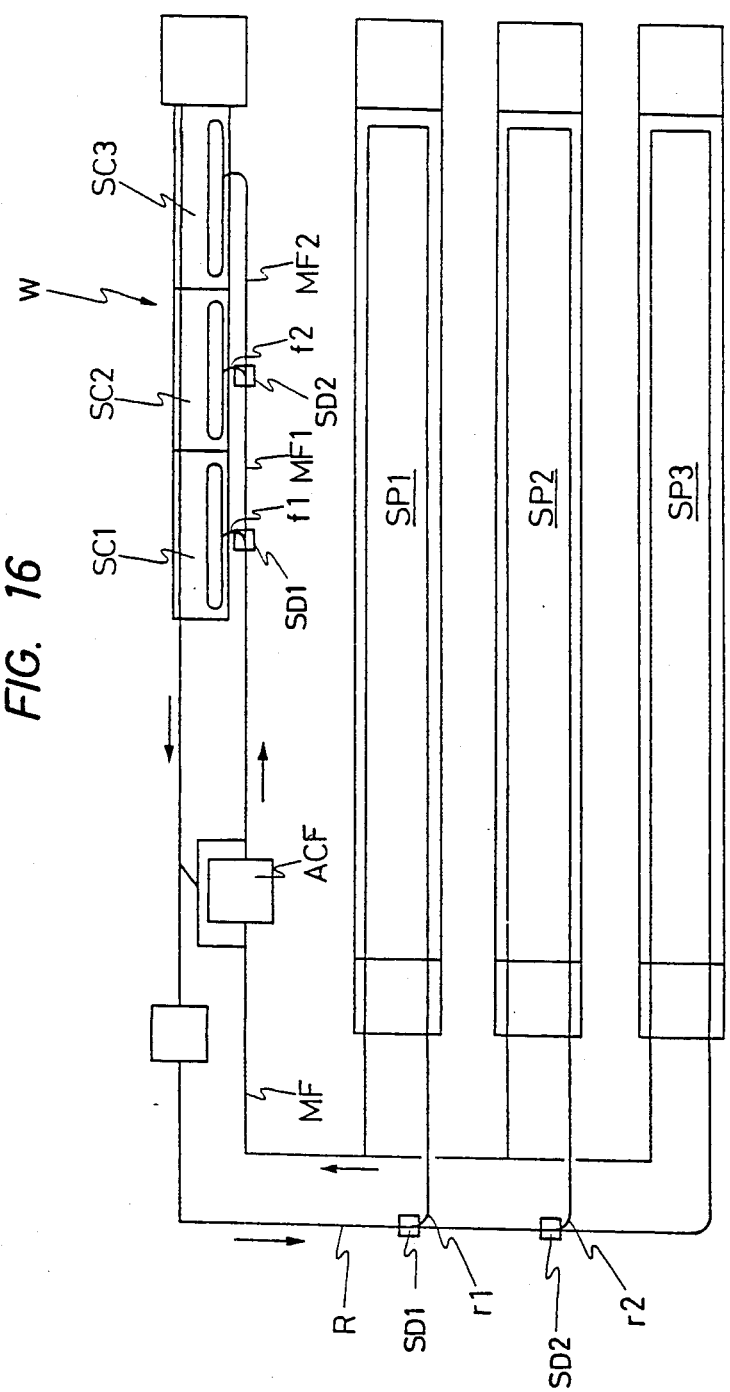

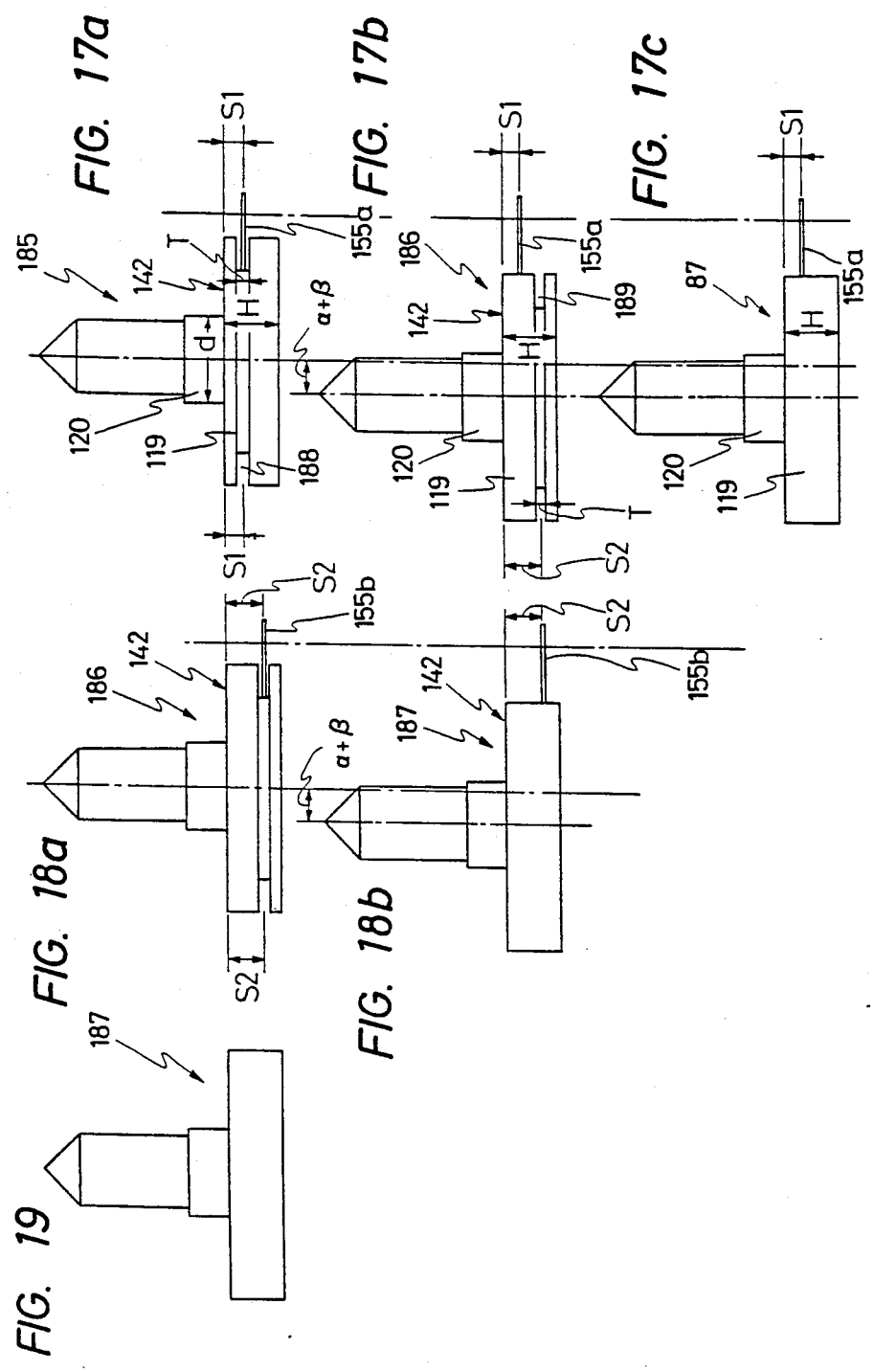

ARTICLE SELECTING AND CONVEYING SYSTEM

This is a division of application Ser. No. 557,068, filed on Dec. 2, 1983 now U.S. Pat. No. 4,681,231.

BACKGROUND OF THE INVENTION

The present invention relates to an article selecting and conveying system, and more specifically, relates to a cop selecting and conveying apparatus which is applied to a system for conveying different kinds of cops to an automatic winder.

There exists a system in which different kinds of articles are conveyed by a common conveyor passage so that they are selected midway of the passage to belong to identical groups and are conveyed to predetermined destinations. More specifically, in the system in which articles being conveyed on a single conveyor are selected in accordance with their colors, shapes, sizes and so on so that the articles belonging to different kinds may be separately conveyed by different branch passages, there are suitably used as a selecting device a variety of methods and devices including one, in which articles belonging to an identical kind are selected by coloring articles belonging to an identical kind in an identical color, by electrically reading said color by means of a mark sensor and by actuating a gate for switching branch passages in response to the signal read out, and another in which articles are discriminated, in case they have different heights, in terms of their heights by judging whether an optical beam is allowed to pass through or intercepted by the articles by means of photoelectric tube sensors disposed at vertically different positions and by operating an actuator for switching the branch passages.

The present applicant has previously proposed a system in which one automatic winder is divided into a plurality of winding sections so that the respective sections may take up the different kinds of cops fed thereto.

The present device contemplates to a cop selecting and conveying apparatus to be used in that system for automatically feeding the cops to the respective winding units without providing the respective winding units with cop storage magazines.

In the conventional methods and apparatus for selecting and conveying articles, generally speaking, most of the methods and devices use electric signals as in the above so that a wiring operation and a drive source for the moving gate are required. In a device such as the mark sensor for selecting the kinds of the articles by judging the colors, alternatively, the reliability of the mark sensor is still so low as to make the reliable selections difficult.

SUMMARY OF THE INVENTION

An object of the present invention is to provide an improved cop selecting and conveying apparatus which is used to a system for conveying different kinds of cops to an automatic winder.

A further object of the present invention is to provide a system which is enabled to conduct the selections of cops by means of a simple device without any mistake. According to a first embodiment of the present invention, a cop carrier for carrying thereon and transferring the cop is formed with a discrimination mark for discriminating the kinds of the cop which is placed on the carrier and a sensor for detecting the discrimination mark of the carrier is provided at the side of a conveyor passage.

According to a second embodiment of the present invention, there is provided an article selecting and conveying system characterized; in that a discriminating groove is formed in eigher an article to be conveyed or a guide member at the side of a conveyor passage; in that a discriminating member through which said discriminating groove can pass is disposed at a position to correspond to said discriminating groove in either of the guide member at the side of said conveyor passage or said article conveyed; and in that there is disposed in said conveyor passage a guide member for guiding the article, which has been selected by said discriminating member, to a conveyor passage especially for said article so that said article may be selected and conveyed to the conveyor passage therefor in dependence upon the presence of the discriminating groove corresponding to said discriminating member.

BRIEF DESCRIPTION OF THE DRAWINGS

FIG. 16 is a layout showing still another example of the article conveying system;

FIGS. 17a, 17b, 17c, 18a, 18b and 19 are explanatory views showing the article selecting principle of the system in FIG. 16;

DETAILED DESCRIPTION OF THE INVENTION

The present invention will be described in the following in connection with the embodiments thereof with reference to the accompanying drawings.

Figure 1:
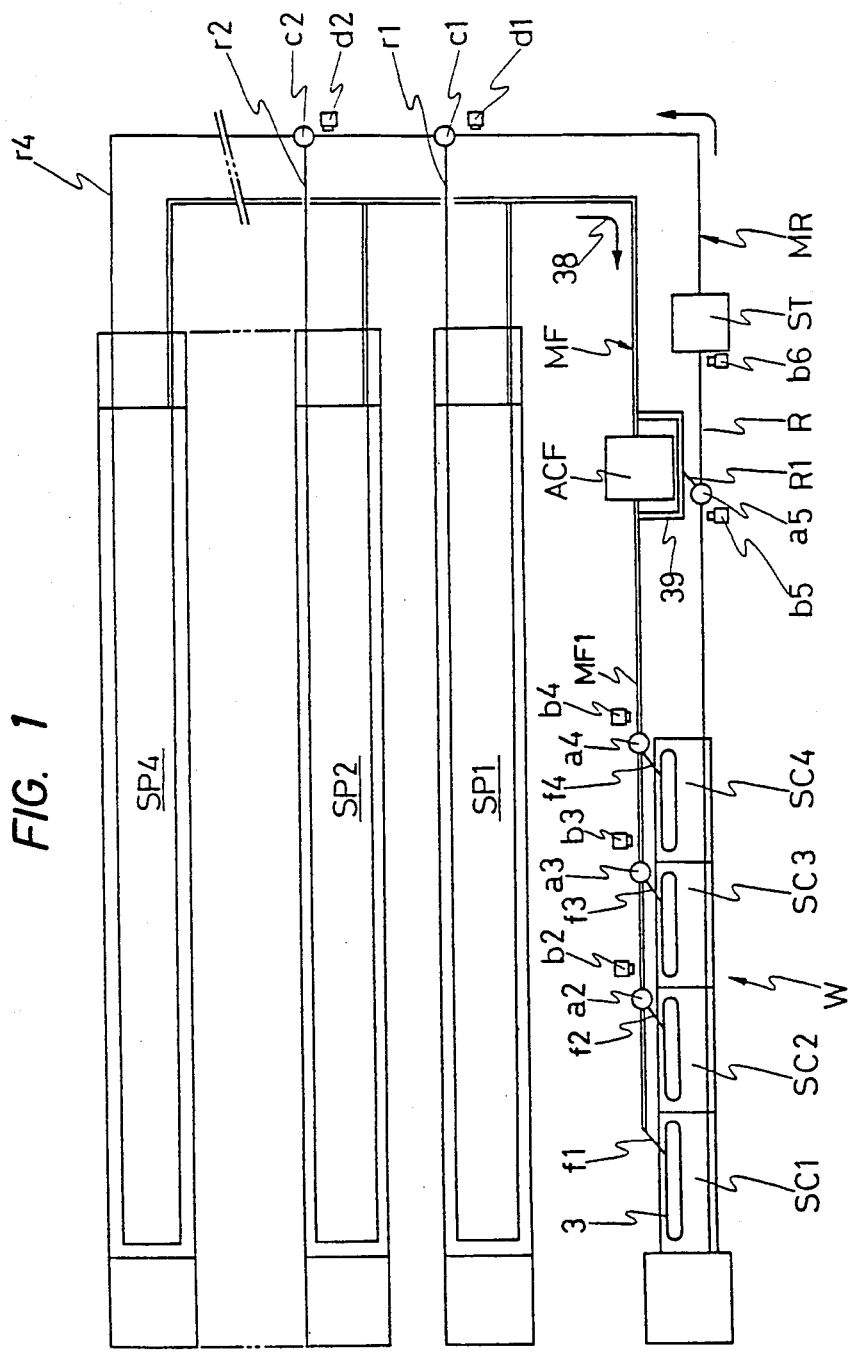
FIG. 1 is a layout showing one example of the cop conveying system to which the cop conveying medium of the present invention is applied.

FIG. 1 shows a layout of one embodiment of a cop conveying system to which the cop conveying carrier according to the present invention is applied. A plurality of fine spinning frames SP1 to SP4 are juxtaposed to one another with respect to one automatic winder W, which is substantially divided into a plurality of winding sections SC1 to SC4 for winding up different kinds of cops.

Between the aforementioned fine spinning frames SP1 to SP4 and the winder W, there are arranged both a cop supplying passage MF for conveying the cops, as indicated by double lines, and an ejecting passage MR for conveying either empty bobbins having no yarn thereon or bobbins having residual yarns thereon, both being ejected from the winder. More specifically, the cop supplying passage MF is formed of: a main supplying passage MF1 for conveying a variety of cops fed from the respective fine spinning frames; and branched supplying passage f1 to f4 branched from said main supplying passage MF1 and communicating to the winding sections SC1 to SC4 of the winder. On the other hand, the ejecting passage MR is formed of; a common ejecting passage R extending through the respective sections SC1 to SC4 and communicating to the fine spinning frames; and branched ejecting passages r1 to r4 branched to the respective fine spinning frames.

At one portion of the aforementioned main supplying passage MF1, there is arranged a readying device ACF for seeking and removing a starting yarn end from the cop. Cop selectors a2 to a4 and cop discriminating sensors b2 to b4 are arranged at the respective winding sections of the main supplying passage MF1. Midway of the ejecting passage R, on the other hand, there is connected through a selector a5 a passage R1 for feeding the bobbins with residual yarns to the readying device ACF. There is also arranged a minimum residual yarn remover ST for removing the left threads of the bobbins. Reference character b5 indicates a sensor for detecting the bobbins with residual yarns, whereas character b6 indicates a sensor for detecting the bobbins with the minimum residual yarns. Moreover, bobbin selectors C1, C2 and so on and bobbin discriminating sensors d1, d2 and so on are arranged at the positions of the respective fine spinning frames of the aforementioned ejecting passage R.

Figure 2:
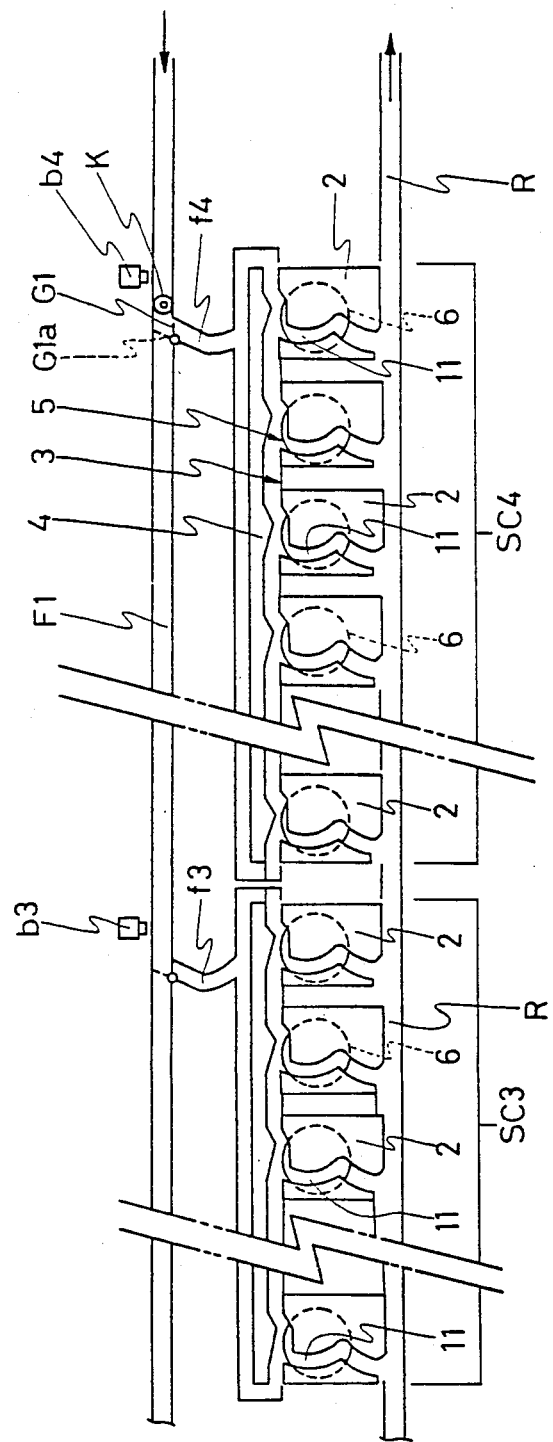
FIG. 2 is a schematic top plan view showing the conveying passage of the winding portion of the same system.

FIG. 2 is a top plan view showing the cop conveying passages of the winder for the two sections SC4 and SC3, but the cop conveying passages are similar for other sections. More specifically, there is arranged at one side along a winding unit 2 a cop feeding passage 3 which leads to the branched supplying passage f4. The cop feeding passage 3 is formed by a belt conveyor and a guide plate 4, for example, and with cop inlets 5 to the respective units. The aforementioned cop feeding passage 3 constitutes in one section a closed loop, in which the cop circulated at all times. Along the other side of the unit, moreover, there is formed the ejecting passage R which extends commonly through the respective sections for conveying the empty bobbins where the yarns have been wound up, the bobbins with residual yarns which have been ejected from the winding unit because of incapability of knotting, and bobbins with minimum residual yarns. The ejecting passage is formed of the belt conveyor and the guide plates.

Figure 3:
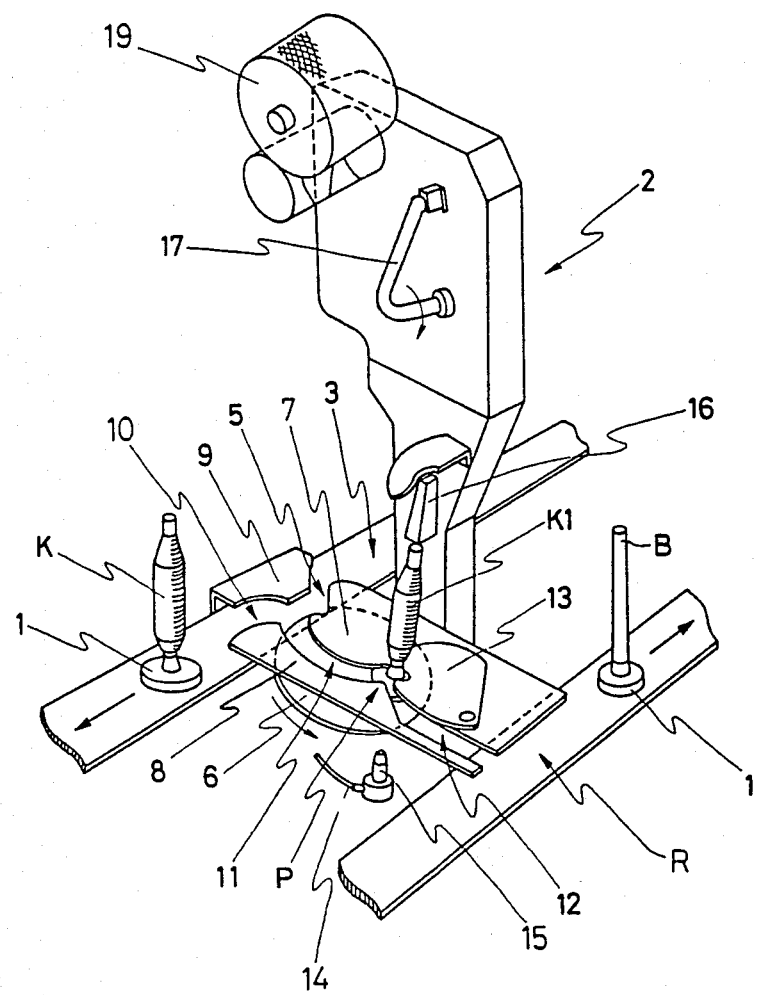
FIG. 3 is a perspective view showing the winding unit of the same system.

FIG. 3 shows one example of the winding unit 2, which is applied to the system thus far described, and a carrier 1 which is a medium for conveying the cop. More specifically, the winding unit 2 is arranged between the cop feeding passage 3 and the ejecting passage R so that the cop is transferred to the yarn running position of the winding unit from the feeding passage 3 by means of a rotary disc 6 and guide plates 7, 8 and 9.

The aforementioned rotary disc 6 is so slightly sloped that its portion at the side of the cop feeding passage 3 is at a higher level than that at the side of the ejecting passage R. Above the rotary disc 6, there are fixed the guide plates 7 and 8 which are positioned at a predetermined spacing from the upper face of the rotary disc and which are formed with the cop inlet 5 and an excess cop outlet 10 between themselves and the guide plate 9. A cop stand-by line 11 and a bobbin eject line 12 are also formed between the guide plates 7 and 8. Indicated at reference numeral 13 is a turning lever for discharging the empty bobbin and the bobbin with residual yarns at the yarn running position. Below the carrier 1 at the yarn running position P, there is disposed an air injection nozzle 15 which is connected with a conduit 14 leading to a not-shown source of compressed air. The air injected from said nozzle 15 is injected through the space in the peg of the carrier 1 from a port formed in the upper end portion of the peg into a pipe of a cop thereby to blow up the yarn end which has already suspended in said pipe. Above the cop K1 at the yarn running position P, there are additionally disposed: a balloon braker 16; a relay pipe for introducing the yarn end at the cop into a not-shown knotting device; a package for taking up the yarn let off from the cop; a suction mouth for introducing the yarn end of said package into the knotting device; a slub catcher for detecting a defect of the yarn; and so on.

Figure 4:
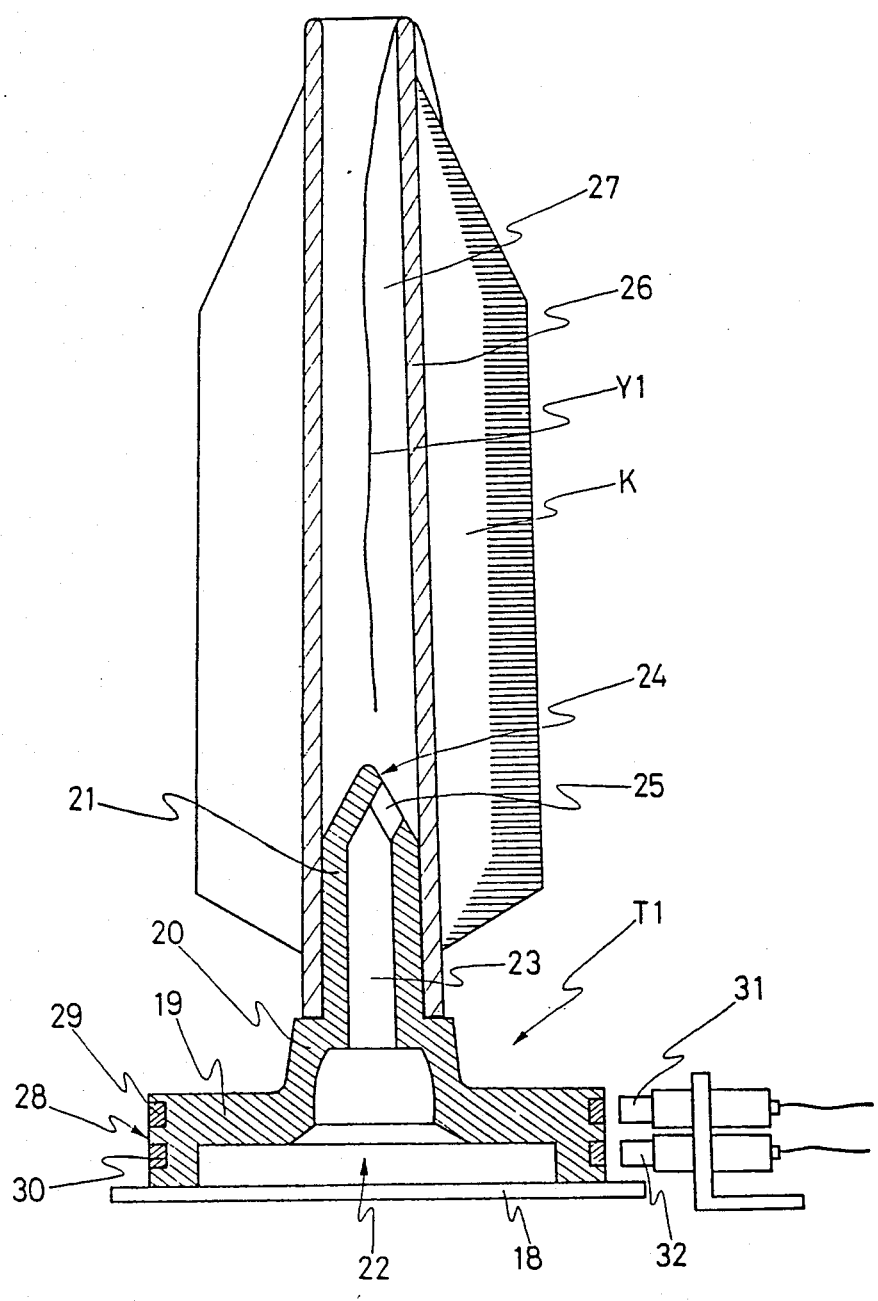
FIG. 4 is a sectional view showing one embodiment of the cop conveying medium according to the present invention.
Figure 5:
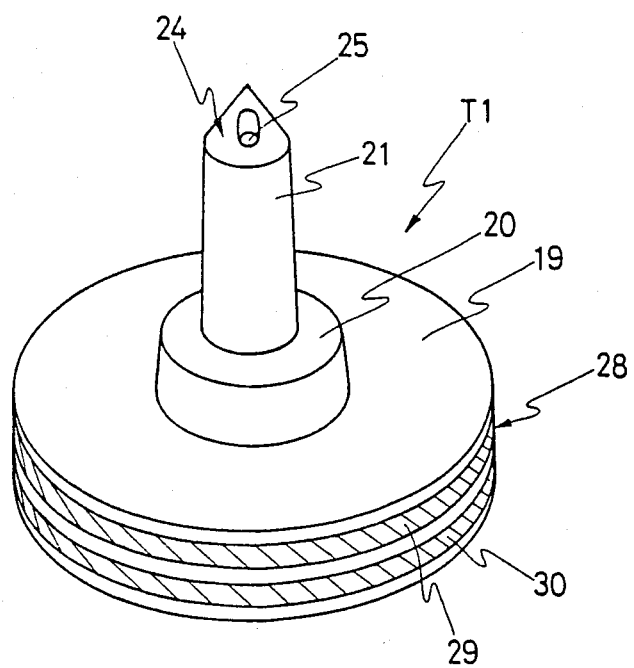
FIG. 5 is a perspective view of the same.

Next, the carrier to be applied to the system thus far described is shown in FIGS. 4 and 5. More specifically, a carrier T1 is integrally constructed, by the molding or fixing process, of: a disc-shaped base 19 placed on a conveyor 18; a disc-shaped platform 20 which is formed on said base 19 and which has a smaller diameter than that of the aforementioned base 19; and a peg 21 placed upright on the center of said platform 20. The carrier T1 has its inner bottom formed with an opening 22 which has communication with the hollow portion 23 of the peg 21. This peg 21 is formed in its top slope 24 with an air injection port 25.

As a result, a cop K is fitted on the peg 21 of the carrier T1 so that it is conveyed together with the carrier and in such an upright state that its lower end face is borne on the upper end face of the platform 20.

Incidentally, a yarn end Y1, which is let off from the cop K when in the knotting operation in the winding unit, is transferred in the state, in which it is inserted to suspend from the upper end of the cop into the central bore 27 of a tube 26, as shown in FIG. 4. When in the joining operation, the air injected from the nozzle at a predetermined position of the winding unit is further injected from the hollow portion 23 of the carrier through the port 25 of the peg 21 into the central bore 27 of the tube 26 so that the suspending yarn end Y1 is blown upwardly of the central bore 27 until it is sucked and clamped by a waiting suction arm.

Moreover, the disc-shaped base 19 of the aforementioned carrier T1 is formed on its outer circumference 28 with a cop discriminating mark, e.g., one or more iron rings 29 and 30, as shown in FIGS. 4 and 5, so that the kinds of the carrier, i.e., the kinds of the cops are discriminated by means of proximity sensors 31 and 32 which are disposed at positions corresponding to said rings 29 and 30.

Since, in the case of the aforementioned embodiment, the iron rings 29 and 30 provided are two in number, it is possible to discriminate four kinds of cops. More specifically, if the case in which the rings 29 and 30 are provided is indicated by a reference character "1" whereas the absence case is indicated by a character "0", the combinations of (0.0), (0.1), (1.0) and (1.1) are obtained and can be read out in terms of the ON and OFF of the proximity sensors 31 and 32. It is naturally possible to discriminate many kinds of cops by increasing and decreasing suitably the number of the iron rings 29 and 30 in accordance with the kinds of the yarns handled and by arranging the proximity sensors in number corresponding to the number of the rings.

Figure 6:
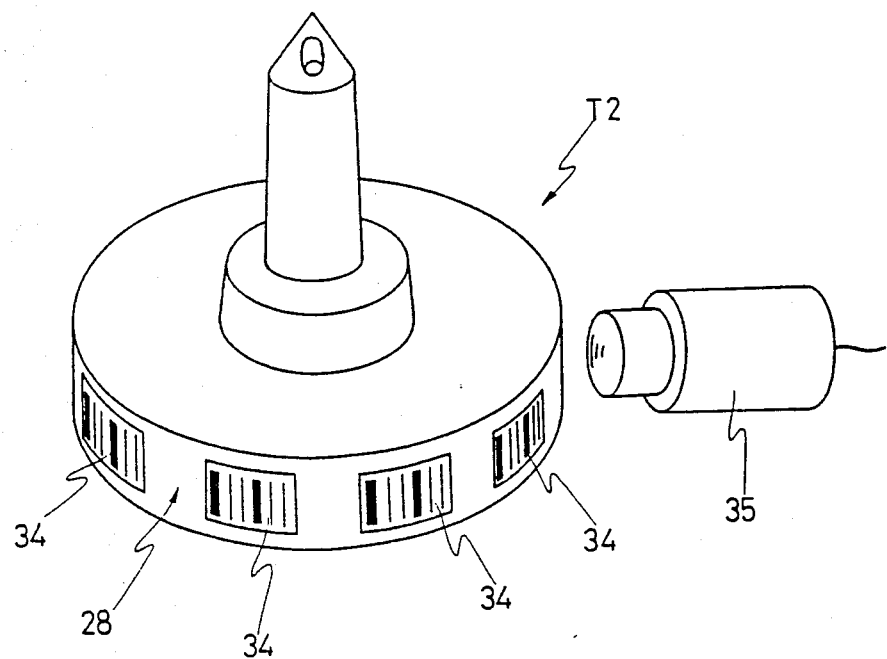
FIG. 6 is a perspective view showing another embodiment of the cop conveying medium.
Figure 7:
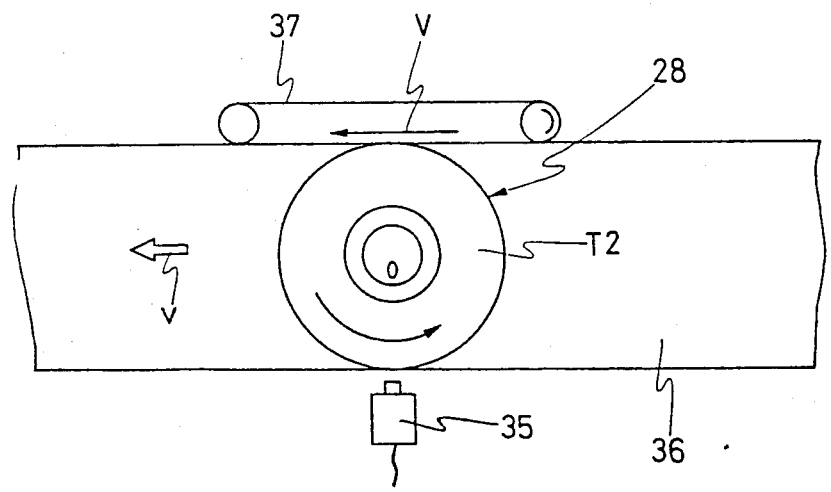
FIG. 7 is an explanatory top plan view showing a method of discriminating the marks of the same conveying medium.

FIG. 6 shows another embodiment of the discrimination mark of the aforementioned carrier. Bar codes 34 are either adhered to or formed in the plural portions of the outer circumference 28 of a carrier T2 and are discriminated by means of a bar code reader 35 which is disposed at a suitable position midway of the carrier conveying passage. Incidentally, it is necessary to turn the aforementioned carrier T2 itself when this carrier is to be read out. For example, at the reading position shown in FIG. 7, a belt 37, which is made rotatable at a higher speed V than the speed v of a carrier conveying belt 36, is forced into contact with the outer circumference 28 of the base or the platform so that the carrier is read out while being turned.

One example of the cop conveying system using the carrier will be described with reference to FIGS. 1 to 3. In FIG. 1, different kinds of yarns are produced by the fine spinning frames SP1 to SP4. It is here assumed that one winding section corresponds to each fine spinning frame such that the yarn of the frame SP1 is rewound by the winding section SC1 whereas the yarn of the frame SP2 is rewound by the winding section SC2.

The cops obtained from the respective fine spinning frames are fitted on the carriers having different marks for the respective kinds of the yarns so that they are transferred to the main supplying passage MF while being grouped in accordance with the yarn kinds or at random independently of the yarn kinds. The carriers being transferred in the direction of arrow 38 consecutively have their yarn ends seeked by the readying device ACF and are transferred in such a state on the main supplying passage MF1 that the yarn ends are suspended into the central bores of the bobbins. The cops where the yarn end reading operation has failed are fed again to the yarn readying device along a feedback passage 39.

The cops having their yarn ends seeked are transferred on the main supplying passage MF1 toward the winder W to pass through the positions of the cop discriminating sensor b4. At this time, if the cops belong to the fine spinning frame SP4, the sensor b4 discriminates the mark of the corresponding carrier to impart an operation instruction to the selector a4, to turn a gate G1 shown in FIG. 2 from a position of a solid line to a position G1a of a broken line, to transfer the cop K onto the branched supplying passage f4, and to feed the same to the cop feeding passage 3 of the section SC4.

As a result, the cops of the fine spinning frame SP1 is fed through the sensors b4, b3 and b2 from the branched supplying passage f1 of the section SC1 onto the feeding passage 3.

Thus, the cops are fed to the winding sections corresponding to the respective fine spinning frames. In the respective sections, the cops are taken from the cop inlets of the respective units 2 shown in FIG. 2 into the stand-by line 11 on the disc 6. In the state of FIG. 3, i.e., the state in which the cops are fitted on the carrier 1, the predetermined cops are fed to the yarn running positions in which they are rewound.

At each unit, either the empty bobbins having been subjected to the rewinding operations or the bobbins with residual yarns having been ejected because of incapability of the yarn joining operation are transferred on the common ejecting passage R. The empty bobbins left with no yarn are transferred on the ejecting passage R and are ejected passing by the residual yarn remover ST to the sides of the fine spinning frames so that predetermined empty bobbins are returned to the predetermined fine spinning frames SP1 to SP4 by the coactions of the discriminating sensors d1, d2 and so on and the selectors c1, c2 and so on which are actuated by said sensors.

As has been described hereinbefore, according to the present device of this embodiment the cop conveying medium for transferring the cops independently one by one is formed with the discriminating mark for discriminating the yarn kinds. As a result, only the predetermined cops can be selected and fed to the predetermined yarn treating units by conveying the conveying mediums carrying the various cops at random along the common conveying passages and by arranging the sensors for discriminating the aforementioned discrimination mark at the predetermined positions. Especially in the system in which the automatic winder is directly connected to the fine spinning frames so that various kinds of yarns are wound by the single winder, a number of cop conveying passages need not be provided so that the space can be effectively used for the remarkably practical purposes.

Another embodiment of the present invention will be described in the following with reference to the accompanying drawings in case it is applied to a cop conveying system.

Figure 8:
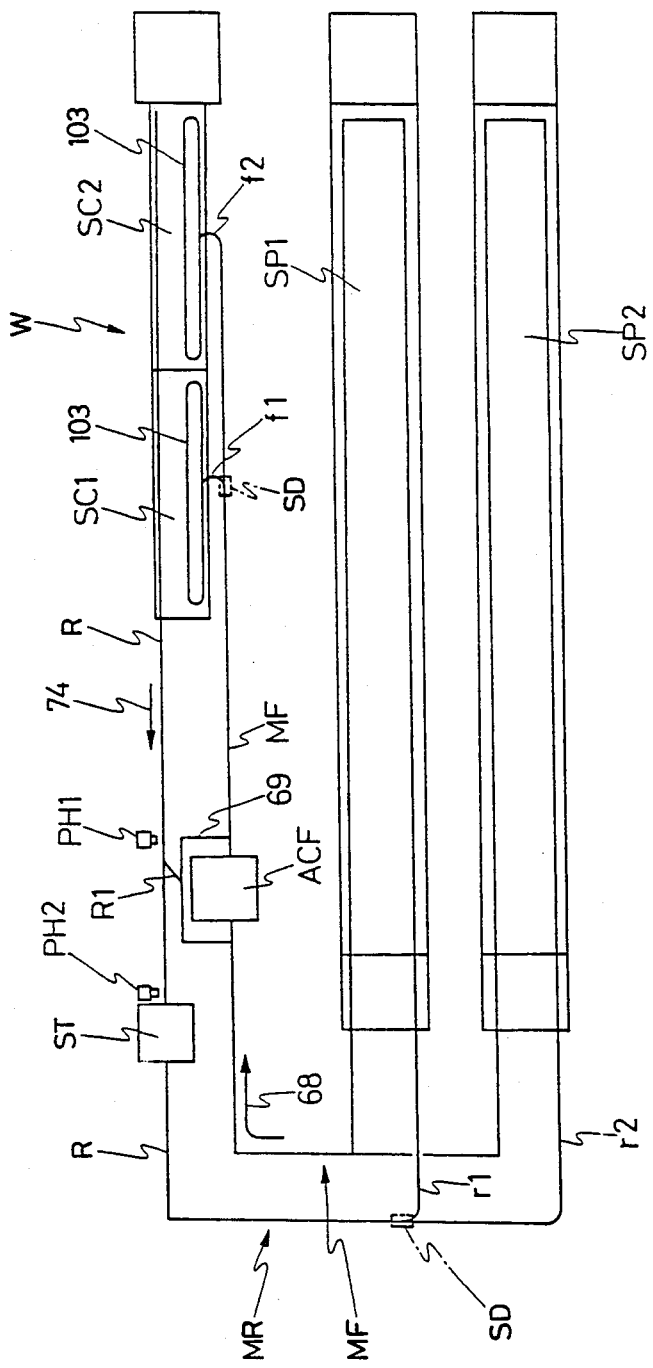
FIG. 8 is a layout showing another example of the cop conveying system.

FIG. 8 is a layout showing another embodiment of the cop conveying system in which one automatic winder is divided into a plurality of winding sections to be fed with cops having different kinds of yarns. More specifically, a plurality of fine spinning frames SP1 and SP2 are juxtaposed to each other with respect to one automatic winder W, which is substantially divided into a plurality of winding sections SC1 and SC2 for taking up different kinds of threads. Incidentally, the description of the present embodiment to be made is directed to the case in which two kinds of yarns are supplied and wound up by the two divided winding sections SC1 and SC2.

Between the aforementioned fine spinning frames SP1 and SP2 and winder W, there are arranged both a cop supplying passage MF for conveying the cops and a cop ejecting passage R for conveying empty bobbins which are ejected from the winder. More specifically, the cop supplying passage MF is composed of: a main supplying passage MF for conveying two kinds of cops doffed and fed from the fine spinning frames; and branched passages f1 and f2 which are branched from said main supplying passage MF and which communicate to cop supplying passages 103 and 103 in the winding sections SC1 and SC2 of the winder. On the other hand, the ejecting passage R is composed of: a common main ejecting passage R which extend through the respective winding sections SC1 and SC2 and which communicate to the fine spinning frames; and branched ejecting passages r1 and r2 branched to the respective fine spinning frames SP1 and SP2.

Midway of the aforementioned main supplying passage MF, there is arranged the readying device ACF for seeking and removing the yarn end from the cop. A cop selecting and distributing system SD according to the present invention is disposed at the winding section SC1 of the main supplying passage MF. Midway of the ejecting passage R, on the other hand, there is connected through a selector PH1, a passage R1 for feeding bobbins with residual yarns to the readying device ACF. There is additionally disposed a minimum residual yarn remover ST for removing the residual yarns on the bobbins so that only the empty bobbins are conveyed to the fine spinning frames SP1 and SP2. Reference letters PH1 indicate a sensor for detecting the bobbins with residual yarns, and letters PH2 indicate a sensor for detecting the bobbins with the minimum residual yarns. Moreover, the selecting and distributing system SD according to the present invention is also arranged at the position of the fine spinning frame SP1 of the aforementioned ejecting passage MR.

Figure 9:
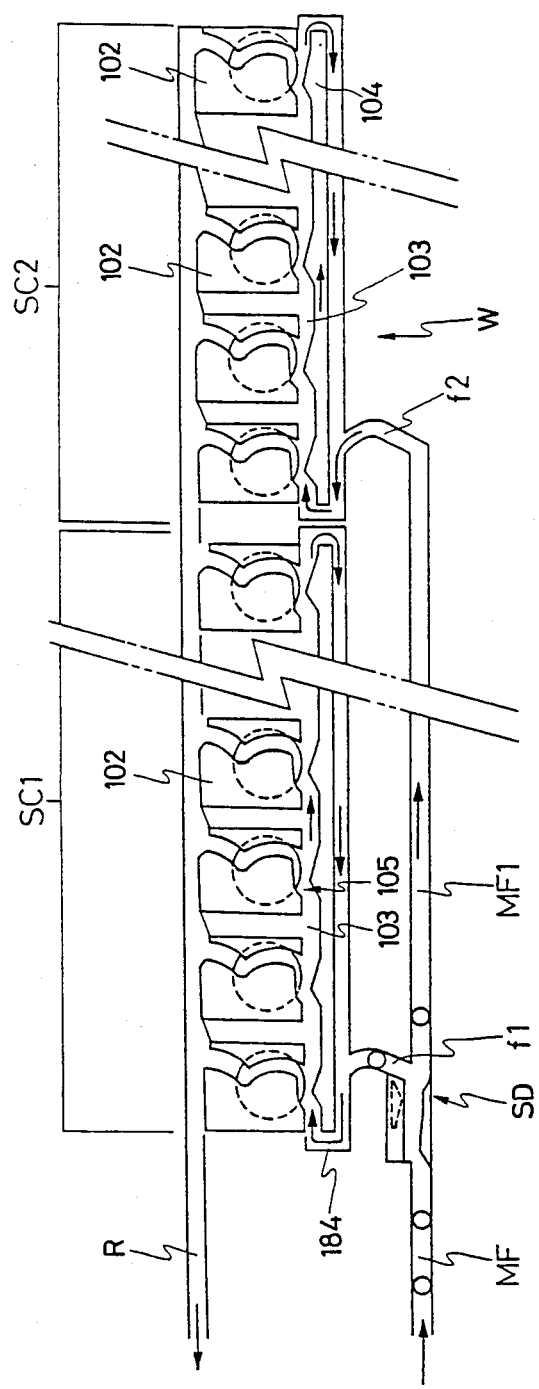
FIG. 9 is a top plan view showing the cop conveying passages of the winding portion of the system in FIG. 8.

FIG. 9 is a top plan view showing the cop conveying passages of the winder. Along and at one side of a winding unit 102, there is arranged the cop feeding passage 103 which leads to the aforementioned branched passage f1. The cop feeding passage 103 is formed, for example, of a belt conveyor and a guide plate and is formed with a cop inlet 105 to each winding unit. The feeding passage 103 constitutes in one section a closed loop, in which the excess cop circulates.

Along the other side of the winding unit, on the other hand, there is arranged the ejecting passage MR which extends commonly through the respective sections for conveying the empty bobbins from which yarns are rewound completely, the bobbins with residual yarns ejected from the winding unit because of incapability of yarn joining, the bobbins with the minimum residual yarns, and so on. The ejecting passage MR is constructed of a belt conveyor and a guide plate.

The winding unit 102, which is applied to the system thus far described, and a medium for conveying the cop are as the similar one as shown in FIG. 3.

Figure 10:
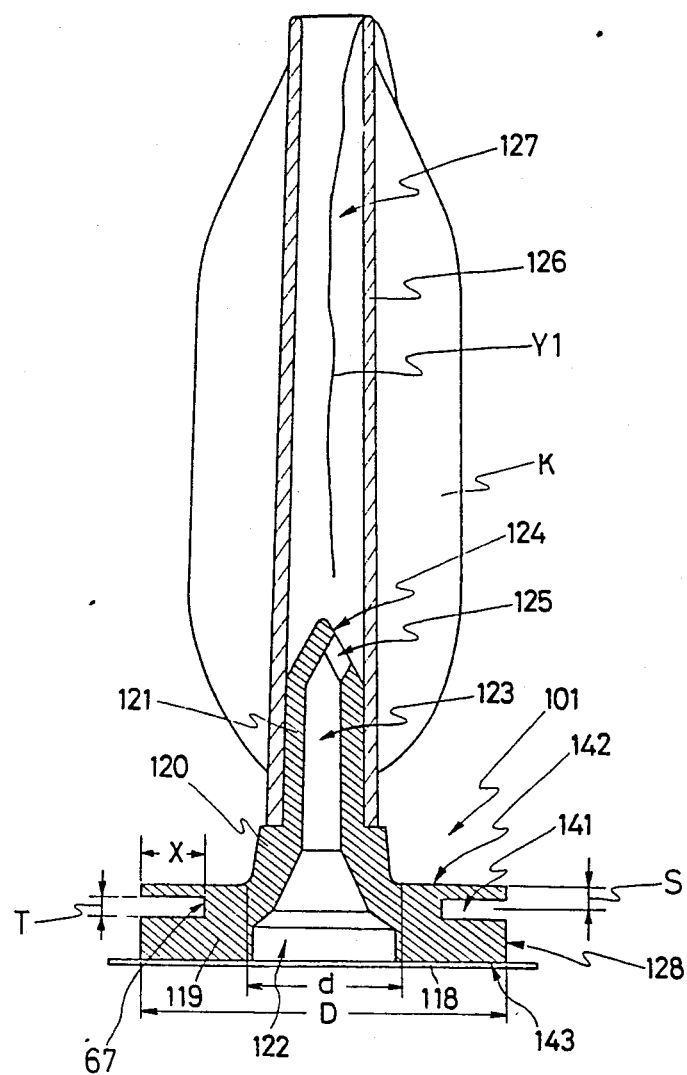
FIG. 10 is a sectional front elevation showing still another embodiment of the article to be conveyed.

The carrier 101 or the cop conveying medium to be applied to the system thus far described is shown in FIG. 10. More specifically, the carrier 101 is integrally formed of: a disc-shaped base 119 to be placed on a conveyor 118; a cylindrical platform 120 which is formed on the upper face of said base 119 and which has a smaller diameter than said base 119; and a peg 121 placed upright on the center of said platform 120. The carrier is formed therein with a space 123 having communication with a bottom opening 122, and the peg 121 is formed in its top slope 124 with a port for air injection. As a result, the cop K is fitted on the peg 121 of the carrier 101 so that the respective cops are conveyed separately and independently together with the carrier in an upright state in which the lower end face of the cop is borne on the upper face of the platform 120.

Incidentally, the yarn end Y1, which is taken out of the cop K when in the joining operation in the winding unit, is conveyed in the state in which it is inserted to suspend from the upper end of the cop into the central bore 127 of a core 126. In the yarn running position of the winding unit, when in the joining operation, the air injected from the aforementioned nozzle is injected from the internal space 123 of the carrier through the port 125 into the central bore 127 of the core 126 so that the depending thread end Y1 is blown up to the outside from the central bore 127 until it is sucked into and clamped by the waiting relay pipe.

Moreover, the disc-shaped base 119 of the aforementioned carrier 101 has its outer circumference 128 formed with a cop discriminating groove 141. This groove 141 is formed to extend all over the outer circumference of the base and in the shape of a band, as viewed in an imaginary plane extending in parallel with the carrier conveying direction, such that it is arranged at a predetermined position from the upper face 142 and lower face 143 of the base and has a width T and a depth X. On the carrier 101 having the aforementioned groove 141, more specifically, there is fitted the cop belonging to an identical kind, which is then conveyed. The cop belonging to another kind is fitted on the carrier without the aforementioned discriminating groove 141 and is conveyed. The yarns are discriminated in terms of their kinds by means of a later-described discriminating member in accordance with the presence of the groove 141 and are selectively conveyed to the corresponding sections.

Figure 11:
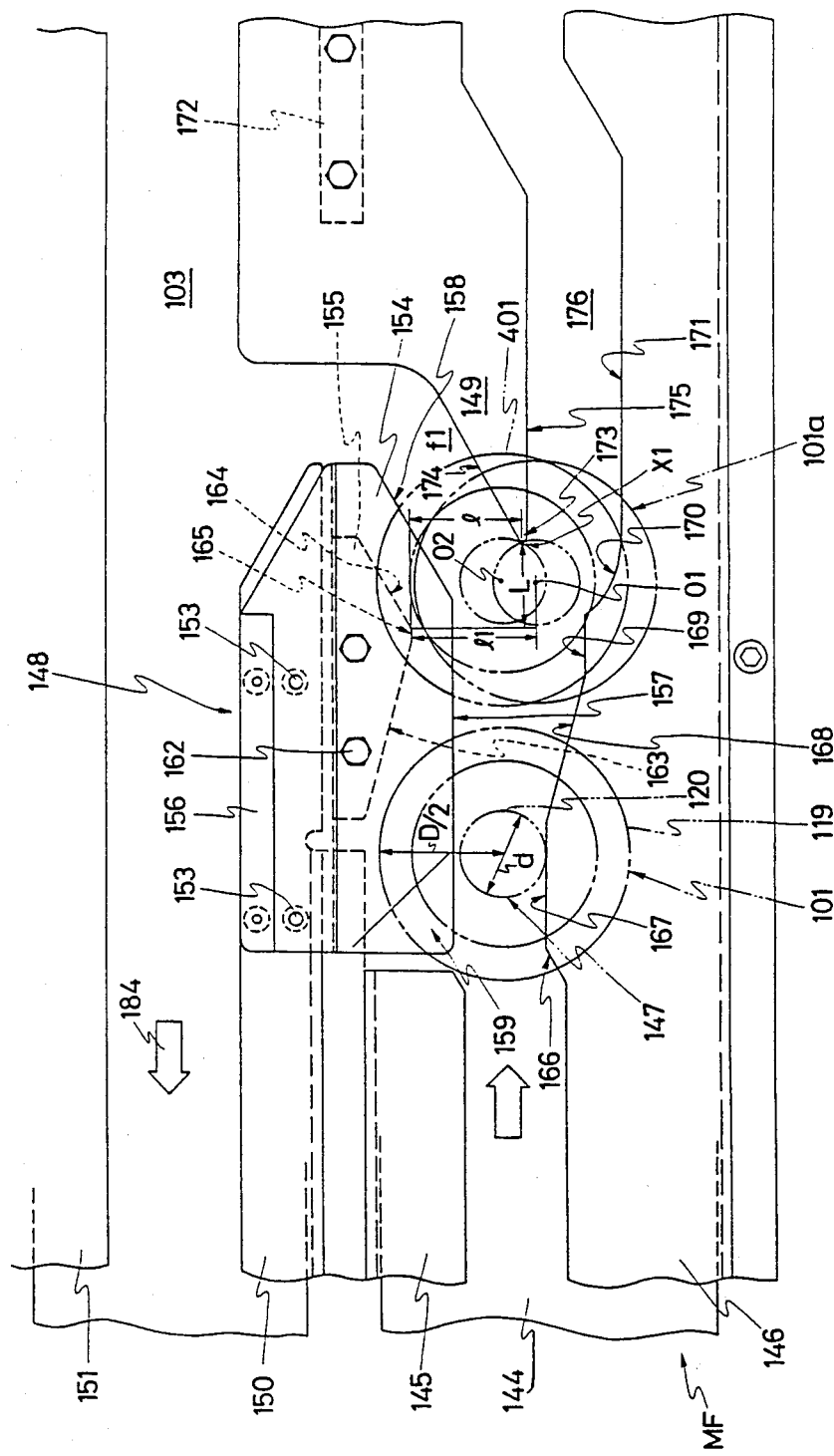
FIG. 11 is a top plan view showing one embodiment of the selecting and distributing device which is disposed at the branched point of the article conveying passage.
Figure 12:
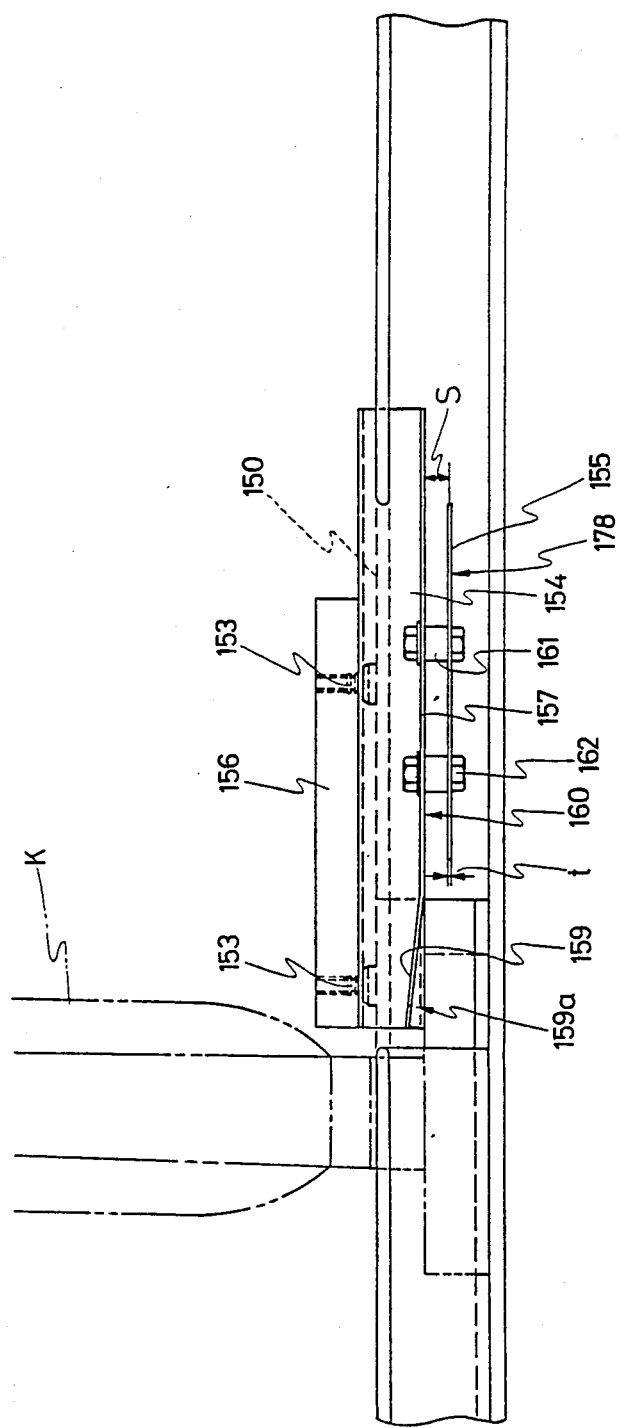
FIG. 12 is a front elevation of the same.
Figure 13:
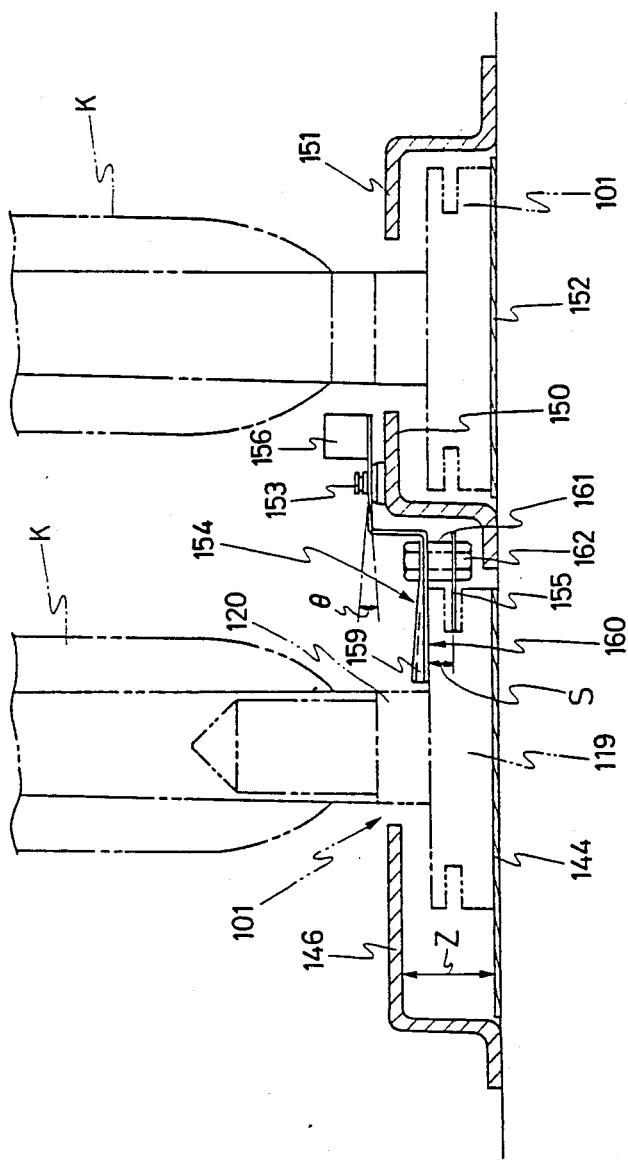
FIG. 13 is a sectional side elevation of the same.

FIGS. 11 to 13 show an embodiment of the discriminating device which is arranged at the position of the winding section shown in FIGS. 8 and 9. More specifically, the cop supplying passage MF is constructed of: a conveyor belt 144; and guide plates 145 and 146 which are positioned at a spacing Z from the upper face of said conveyor belt 144. The carrier is conveyed, while being guided, such that the lower face of the base 119 is placed on the conveyor 144 whereas the outer circumference 147 of its cylindrical platform 120 is interposed between the guide plates 145 and 146.

At the branched point, there are disposed subsequent to the guide plate 145 a carrier discriminating member 148 and a guide member 149 for distributing the carriers. The aforementioned discriminating member 148 is constructed of: a first guide plate 154 which is loosely fitted on a guide plate 150 or pins 153 and 154 on the frame so that it can swing up and down slightly within a range of an angle 0 on the pin 153, as shown in FIG. 13; a second guide plate 155 which is fixed below said plate 154 in parallel with and at a spacing S from the plate 154; and a weight 156 which is screwed on the first guide plate 154.

The side edge of the feed passage side of the aforementioned first guide plate 154 is composed of: a parallel portion 157 extending in parallel with the turning direction of the conveyor; and a sloped portion 158 extending from said parallel portion 157 at an inclination toward the winding section. One end of said plate 154 forms an upward expanded diverged portion 159, the lower face 159a of which provides an inlet guide of the carrier. Moreover, the lower face 160 of the plate leading from said diverged portion 159 provides a reference face 160, which is to abut against the upper face 142 of the base 119 of the carrier 101.

On the other hand, the second guide plate 155, which is spaced by a distance S through collars 161 from the reference face 160 of the aforementioned first guide plate 154 and which is fixed by means of screws 162, is made of a thin plate which has a sufficiently smaller thickness t than the width T of the groove 141 of the carrier 101. Said plate 155 is fixed by means of the screws 162 and 162 such that it extends in parallel with the whole area of the reference face 160 of the aforementioned first guide plate 154. Moreover, the side edge of the second guide plate 155 is composed of: sloped portions 163 and 164 sloped toward the central portion of the conveyor 144; and an apex or a parallel portion 165 which is formed in the apex between said sloped portions 163 and 164.

On the other hand, the guide plate 146 at the side opposing the aforementioned discriminating member 148 opposing the aforementioned discriminating member 148 are formed of: a sloped face 166 and a parallel portion 167 for pushing the carrier 101 toward the discriminating member 148; a sloped portion 168 which is adapted to guide along the plate 155 the base of the carrier without the groove to receive the aforementioned second guide plate; a parallel portion 169 for moving the carrier toward the third guide member 149; and a curve portion 170 and a parallel portion 171 which are separated subsequent to said parallel portion 169 by the third guide member 149 and which are suitable for sending out the carrier to the subsequent section.

Moreover, the third guide member 149, which is fixed on a grame 172, is formed a sharpened leading end portion 173 substantially at the central portion of the conveyor belt 144. One guide edge 174 leading from said leading end portion forms together with the sloped face 158 of the first guide member 159 the branched passage f1 for feeding the cop to the winding section under consideration, whereas the other guide edge 175 forms a sending groove 176 together with the parallel portion 171 of the opposite guide plate 146.

The arrangement relationships between the aforementioned second guide plate 155 and the leading end portion 173 of the third guide plate 149 are shown in FIG. 11. More specifically, the distance l taken in the widthwide direction of the belt between the parallel portion 165 of the second guide plate 155 and the leading end portion 173 of the third guide plate 149 is at least shorter than the radius (D/2) of the disc-shaped base 119 of the carrier, and the distance L between the apex 165 of the second guide plate 155 and the leading end portion 173 of the third guide plate 149 is set at a value at least longer than the diameter d of the cylindrical platform 120 of the carrier. More specifically, the distance l is suitable for that, when a grooveless carrier 101a is moved in the widthwise direction of the belt such that its base circumference is guided along the second guide plate 155, the center 01 of the carrier is offset to the outlet groove 176 from an abutting point between the third guide plate 149 and the platform 120, and that, when the grooved carrier 101 passes over the second guide plate 155 to abut against the third guide plate 149, the center 02 of the carrier 101 is offset to the branched passage f1 from the aforementioned abutting point X1. The leading end portion 173 of the third guide plate 149 is set at the distance between the center 01 of the carrier 101a without the discriminating groove, which is offset by the second guide plate 155, and the center 01 of the carrier 101 with the discriminating groove, which is not offset by the second guide plate 155.

On the other hand, the aforementioned distance L is suitable for that the grooveless carrier 101a offset by the second guide plate 155 is moved, while being held in the offset position, in parallel to abut against the third guide plate 149, and that, when the grooved carrier 101 is transferred to the branched passage f1, the bottom 177 of the groove does not have its movement blocked by the apex 165.

Incidentally, the aforementioned first guide plate 154 is enabled, as shown in FIG. 13, to swing freely within a range of an angle 0 on the pin 153 and is positioned in its awaiting state slightly below the position 154 of a solid line of FIG. 13 by the balance with the weight 156 so that the carrier is brought, when it comes in, into abutting contact with the diverged portion 159 of the end portion of the first guide plate, whereby the carrier reference face 142 come into close contact with the lower face 160 of the first guide plate 154 while pushing up the first guide plate 154. More specifically, even if the conveyance face of the carrier is made slightly rough, the reference face 142 of the carrier swings the first guide plate 154 to come into close contact with the same so that the discriminating groove 141 is aligned with the position of the second guide plate 155 integrated with the aforementioned first guide plate 154. In case the second guide plate is fixed on the frame, the swinging stroke corresponding to the aforementioned angle 0 is required of the width T of the carrier groove so that the height of the carrier base 119 has to be increased. In case two or more discriminating grooves are formed in said base, there arises other disadvantages that the carrier height is remarkably increased to invite instability and that the base diameter has to be enlarged.

The operations of the conveying system having the article selecting and distributing system thus far described will be explained in the following.

Figure 14:
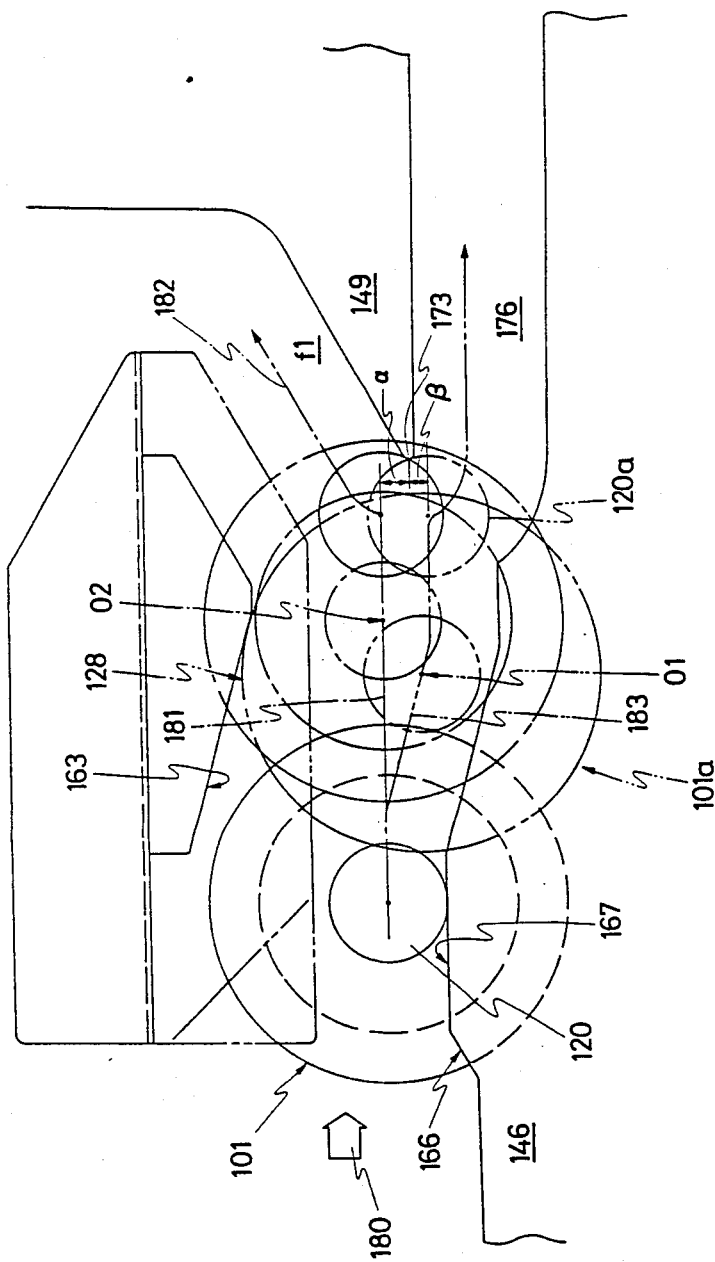
FIG. 14 is an explanatory view showing the selecting operation.

Reverting to FIG. 8, it is assumed that different kinds of yarns are produced by the fine spinning frames SP1 and SP2, and that the yarn of the fine spinning frame SP1 is rewound by the winding section SC1 whereas the yarn of the fine spinning frame SP2 is rewound by the winding section SC2. The cops produced by the aforementioned respective fine spinning frames SP1 and SP2 are grouped and fitted in accordance with the yarn kinds upon the carrier with and without the discriminating grooves so that they are conveyed on the main supplying passage MF either in a manner to be grouped for the yarn kinds or at random. Incidentally, in the case of the present embodiment, the cops of the fine spinning frame SP1 are fitted on the carriers with the discriminating grooves whereas the cops of the fine spinning frame SP2 are fitted on the carriers without the discriminating grooves so that they may be conveyed. The cops being conveyed in the direction of arrow 178 have their yarn ends consecutively seeked by the readying device and are conveyed in the state of FIG. 10 on the main supplying passage MF. Incidentally, the cops having their yarn end readying operations mistaken are fed back to the readying device ACF on a feedback passage 179. The cops having been subjected to the yarn end readying operations are conveyed on the main supplying passage MF toward the winder W until they reach the position of the selecting and distributing system SD. At this time, as shown in FIG. 14 all the carriers take positions, in which the carrier platforms 120 are regulated and guided by the sloped portion 166 of the guide plate 146 to abut against the parallel portion 167 so that they are transferred from said positions to the direction of arrow 180 by the turning motion of the conveyor belt 144 in the arrow direction 180. Incidentally, the carriers 101 in the aforementioned positions pass over the diverged portion 159 of the first guide plate 154 and are held in the state in which the upper face 142 of their base is in close contact with the reference face 160 of the first guide plate 154. As a result of the subsequent transfer, the carriers, i.e., the cops are discriminated by means of the second guide plate 155. In case the carriers 101 have the discriminating grooves 141, as has been described hereinbefore, these groove 141 pass while riding over the second guide plate 155. As a result, the carriers are not offset but advance straight such that their centers 02 move along a single-dotted line 181 of FIG. 14 so that their platform 120 abuts against the leading end portion 173 of the third guide plate 149. By the turning force of the belt 144, moreover, the carriers 101 are conveyed in the direction of arrow 182 until they are transferred through the branched passage f1 onto the cop feeding passage 103 of the take-up section SC1 (which is shown in FIG. 8).

If, on the other hand, carriers the 101a of FIG. 14 do not have the discriminating grooves, the circumference 128 of the base 119 is moved along the sloped face 163 of the second guide plate 155 in accordance with the transfer of the carriers so that the carrier center 01 is moved, while drawing a locus shown by a double-dotted line 183 until its platform 120a comes into abutting contact with the third guide plate 149. By the turning force of the conveyor, moreover, said carrier 101a is pushed toward the outlet 176 so that it is conveyed on the main supplying passage MF to the subsequent take-up section SC2 without advancing into the branched passage f1. The selection and conveyance thus far described are caused by the position of the carrier platform 120 which abuts against the leading end portion 173 of the third guide plate 149, as shown in FIG. 14. The operational principle is shown in FIG. 15.

Figure 15:
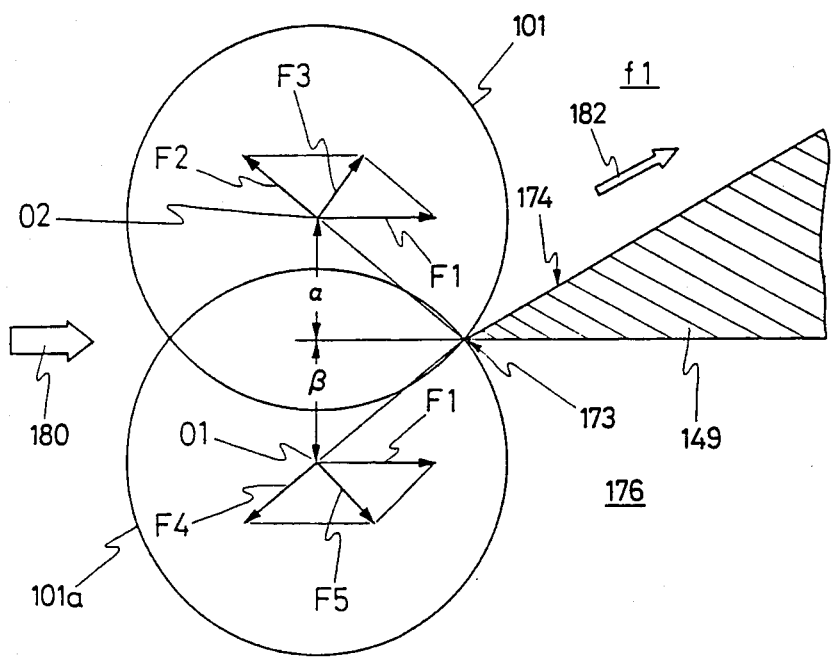
FIG. 15 is an explanatory view showing the relationship among the forces when the articles are to be selected and distributed.

As shown in FIG. 15, more specifically, if the center 02 of the carrier 101 comes into abutting contact while being offset to the branched passage f1 by a distance $\alpha$ from the abutting point 173 of the third guide plate 149, the center 02 of gravity of the carrier 101 is acted by both a running force F1 by the belt 144 in the direction of the arrow 180 and a reaction F2 when the carrier abuts against the guide plate 149 so that the carrier 101 is moved in the direction of the resultant force F3 of the aforementioned running force F1 and reaction F2, i.e., toward the branched passage f1 until it is transferred along the guide face 174 in the direction of the arrow 182. If, on the other hand, the center 01 of carrier 101a is offset to the outlet 176 by a distance $\beta$ from the abutting point 173 of the third guide plate 149, the center, i.e., the center 01 of gravity of the carrier 101a is acted by both the running force F1 resulting from the turns of the belt and a reaction resulting from the abutment against the third guide plate 149 so that the carrier 101a is moved in the direction of the resultant force F5 of the running force F1 and the reaction F4 until it is moved to the outlet 176.

After having been selected in the aforementioned manner, the cops belonging to an identical kind are transferred onto the cop distributing passage of the take-up section SC1 of FIG. 9, while being fitted on the carriers, so that they are conveyed on the feeding passage 103 in the direction of arrow 184. In the aforementioned take-up section SC1. as shown in FIG. 3, the cops being conveyed on the conveyor 3 are taken, if there is a room in the cop awaiting groove 11 of the winding unit 2, out of the inlet 5 into the stand-by line 11 by the coactions of the guide plates 7, 8 and 9 and the rotary disc 6. When a predetermined number of cops are taken in the aforementioned stand-by line 11, the accompanying cops are blocked from any advance by the carrier of the trailing cop in the stand-by line so that they are conveyed from the excess cop outlet 10 to the subsequent winding unit.

As shown in FIG. 9, incidentally, the cop on a main supplying passage FM1, which has passed through the position of the selecting and distributing system SD, is automatically transferred from the end portion passage f2 onto the feeding passage 103 of the winding section SC2. It is quite naturally that the carriers leading to said passage f2 are so identical that they have no discriminating groove in the case of the present embodiment. As a result, the cops belonging to the identical kind are fed thereby to make any discriminating device unnecessary.

Incidentally, the empty bobbins, the bobbins with residual yarns and so on, which are discharged from the respective winding units onto the ejecting passage MR, are conveyed, as shown in FIG. 8, on the ejecting passage in the direction of the arrow 184 while being fitted on the carriers so that all the carriers that have passed over the position of the minimum residual yarn remover ST carry the empty bobbins and are conveyed to the fine spinning frames SP1 and SP2. As a result, if the selecting and distributing system SD like that of the foregoing embodiment is disposed in the branched point r1 of the ejecting passage R, the carriers having the discriminating grooves are returned to the fine spinning frame SP1, whereas the other grooveless carriers are returned to the fine spinning frame SP2. Thus, the empty bobbins are returned without fail to the initial fine spinning frame so that they are not mixed even if they belong to different kinds.

The description of the aforegoing embodiment is directed to the case in which two kinds of cops are selected and conveyed. However, the selection and conveyance can be made by the aforementioned method even in the case of three or more kinds.

In case three kinds of cops, for example, are to be fed to the corresponding winding sections, as shown in FIG. 16 to 19, the single winder W is divided into the winding sections SC1, SC2 and SC3 in a manner to correspond to the respective fine spinning frames SP1, SP2 and SP3, as shown in FIG. 16, and the cops belonging to the different kinds are conveyed on the main supplying passage Mf so that they are selected through the readying device ACF at the branched points f1 and f2. The cop conveying carriers to be applied to the aforementioned system are shown in FIGS. 17a, 17b and 17c to belong to three kinds 185, 186 and 187, of which one is the carrier 185 formed with a discriminating groove 188 at the spacing S1 from the reference face 142, another is a carrier formed with a discriminating groove 189 at the spacing S2 from the reference face 142, and still another is the carrier 189 having no discriminating groove. The bases 119 of the respective carriers 185, 186 and 187 are all equal in their height H and diameter D and in the diameter d of their platforms 120 except the presence of the discriminating grooves or the positions of the grooves from the reference face.

At the branched points f1 and f2 between the main supplying passage MF and the winding sections SC1 and SC2 of FIG. 16, moreover, there are arranged selecting and distributing systems SD1 and SD2 which are equipped with the first, second and third guide plates and so on like the aforementioned embodiment.

Said systems have a similar construction except that the mounting positions of the second guide plates from the first guide plates are different. More specifically, FIG. 17a, 17b and 17c show the mounting position of the second guide plate 155 at the branched point f1. On the lower face of the first guide face, i.e., at a position at the distance S1 from the reference face 142 of the carrier, there is disposed a second guide plate 155a which has a smaller thickness than the width T of the discriminating groove. Moreover, FIGS. 18a and 18b show the mounting position of a second guide plate 155b at the branched point f2, in which the guide plate is mounted at the spacing S2 from the reference face 142. The selecting and distributing systems SD1 and SD2 at the branched points f1 and f2 are absolutely similar to that shown in FIG. 11, as viewed in top plan.

As a result, the carrier 185 of FIGS. 17a, 17b and 17c is used as a conveying medium especially for the cop to be rewound at the winding section SC1 of FIG. 16 and is circulated between the fine spinning frame SP1 and the winding section SC1. The carrier 186 is used as a conveying means especially for the cop to be rewound at the winding section SC2 and is circulated between the fine spinning frame SP2 and the winding section SC2. Moreover, the carrier 187 is circulated between the remaining winding section SC3 and the remaining fine spinning frame SP3.

In the aforementioned system, more specifically, the cops or carriers 185, 186 and 187 belonging the three kinds, which are being conveyed on the main supplying passage MF, are subjected to a first selection at the branched point f1. Since at this branched point f1, the second guide plate 155a is at the spacing S1 from the reference face 142, as shown in FIG. 17a, 17b and 17c, only the carrier 185 having the discriminating groove in the same position is transferred by the same action as that of the aforementioned embodiment from the branched passage f1 onto the cop feeding passage 103 of the winding section SC1, whereas the remaining carriers 186 and 187 are offset by the distance $(\alpha+\beta)$ in the widthwise direction of the belt until they proceed from the outlet to the subsequent winding section. Thus, of the three kinds of the carriers being conveyed on the supplying passage MF, only the carrier 185 is fed to the winding section SC1.

Subsequently, the remaining carriers 186 and 187 are conveyed on a supplying passage MF1 to the branched point f2. Since, at this point, the second guide plate 155b is positioned at the spacing S2 from the reference face 142, as shown in FIGS. 18a and 18b, only the carrier 186 is selected and conveyed to the branched passage f2 and is transferred onto the feeding passage 103 of the winding section SC2, whereas only the grooveless carrier 187 is conveyed on a supplying passage MF2 and is fed from the end portion of the supplying passage MF2 to the winding section SC3 without any requirement for the second guide plate for the selection shown in FIG. 19.

Even in the ejecting passage R at the fine spinning frame side, incidentally, as shown in FIG. 16, if there is arranged at the branched point r1 a system which is similar to the selecting and distributing system SD1 at the branched point f1 at the winder side and if there is arranged at the branched point 152 a system which is similar to the selecting and distributing system SD2, then the carrier 185 for the winding section SC1, the carrier 186 for the winding section SC2 and the carrier 189 for the the remaining section SC3 can be selected and returned to the fine spinning frames SP1, SP2 and SP3, respectively.

Thus, arbitrary n (n=2, 3, 4 and so on) kinds of cops or articles can be selected.

Figure 20A:
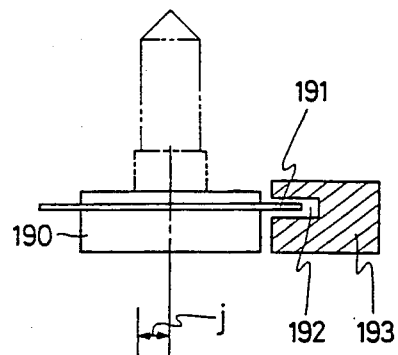
FIGS. 20a, 20b and 20c are views showing another embodiment of the discriminating groove and the discriminating member.
Figure 20B:
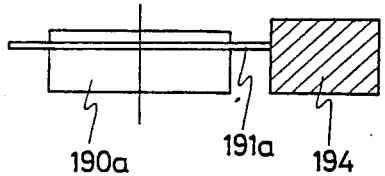
Figure 20C:
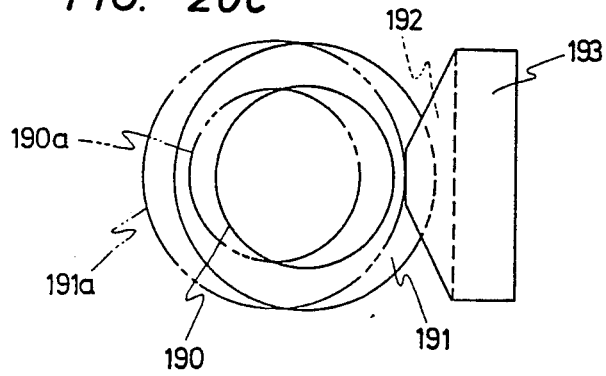
Figures 21A, 21B, 21C:
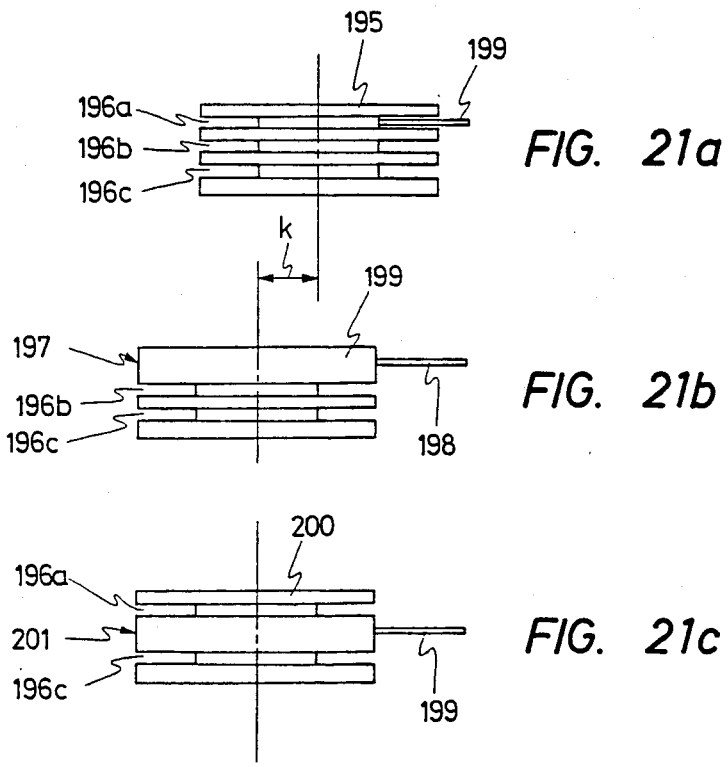
FIGS. 21a, 21b and 21c are views showing still another embodiment of the discriminating groove and the discriminating member.

As shown in FIG. 11, incidentally, in the present embodiment, there are disposed at the side of the branched point f1 the first and second guide plates 154 and 155, the latter of which pushes to offset the carrier to the outlet 176. However, the first and second guide plates 154 and 155 may be disposed at the side of the guide plate 146 so that the carrier can be selected and conveyed while being pushed and offset to the side of the branched passage f1. In another alternative, as shown in FIGS. 20a, 20b and 20c, a ring-shaped guide plate 191 protruding from the circumference is fixed on the base of the aforementioned carrier 190, and either a cam plate 193 formed with a discriminating groove 192, through which said guide plate passes, or a cam plate 194 having no discriminating groove is fixed on the conveying passage so that the guide plate at the side of the carrier comes into abutting contact with the grooveless cam plate until it is offset by a letter j for the selecting and conveying purposes. In another alternative, as shown in FIGS. 21a, 21b and 21c, the base 195 of one carrier is formed at different heights with a plurality of discriminating grooves 196a to 196c and at a predetermined groove position with not any groove but closed portions 87 and 91, and the vertical positions of guide plates 198 and 199 at the conveying passage side are changed for the respective branched points. Then, as shown in FIGS. 21a, 21b and 21c, the carrier 199 is pushed at the position of the guide plate 198 and is offset by a letter k, but the carriers 195 and 100 are not offset at the position of the guide plate 198. On the other hand, the carrier 200 is offset not at the position of the guide plate 198 but at the position of the guide plate 199. The selection can be effected by the action of the third guide plate (which is indicated at 149 in FIG. 11) and so on in accordance with that offset k.

As has been described hereinbefore, according to the present invention, there is provided an article selecting and distributing system characterized: in that the discriminating groove is formed in either the article to be conveyed or the guide member at the side of the conveyor passage; in that the discriminating member through which the discriminating groove can pass is disposed at a position to correspond to the discriminating groove in either of the guide member at the side of the conveyor passage or the article conveyed; and in that there is disposed in the conveyor passage the guide member for guiding the article, which has been selected by the discriminating member, to the conveyor passage especially for the article so that the article may be selected and distributed to the conveyor passage therefor in dependence upon the presence of the discriminating groove corresponding to the discriminating member. As a result, the selection of the articles can be mechanically conducted by the use of the remarkably simple members, and the selection and conveyance of high reliability can be conducted without any use of electric signals.

What is claimed is:

1. A cop selecting and conveying apparatus in a system having a plurality of spinning frames, an automatic winder divided into a plurality of winding sections for winding up different kinds of cops at each winding section, a cop supplying passage connecting the spinning frames and the winder for conveying carriers on which different kinds of cops fed from the spinning frames are placed, and an ejecting passage for conveying carriers ejected from the winder to the spinning frames, said cop selecting and conveying apparatus comprising:

a conveying passage, a carrier configured to be transferred on the conveying passage, said carrier comprising:

a base having an outer circumference, a platform disposed on the base, and a substantially upright peg positioned adjacent the center of the platform and configured to fit a cop thereon so that the cop and the carrier are conveyed together between the winder and the spinning frame, a cop discriminating mark comprises at least one iron ring formed on the outer circumference of said base, and a sensor disposed adjacent the conveying passage for detecting the discriminating mark.

2. A cop selecting and conveying apparatus in a system having a plurality of spinning frames, an automatic winder divided into a plurality of winding sections for winding up different kinds of cops at each winding section, a cop supplying passage connecting the spinning frames and the winder for conveying carriers on which different kinds of cops fed from the spinning frames are placed, and an ejecting passage for conveying carriers ejected from the winder to the spinning frame, said cop selecting and conveying apparatus comprising:

a conveying passage, a carrier configured to be transferred on the conveying passage, said carrier comprising:

a base having an outer circumference, a platform disposed on the base, and a substantially upright peg positioned adjacent the center of the platform and configured to fit a cop thereon so that the cop and the carrier are conveyed together between the winder and the spinning frame, a cop discriminating mark comprising at least one bar code label positioned on the outer circumference of said base, and a sensor disposed adjacent the conveying passage for detecting the discriminating mark.

3. An apparatus as claimed in claim 2 further comprising:

means for rotating the outer circumference of said base relative to said sensor.

4. An apparatus as claimed in claim 3, wherein said means for rotating comprises a belt provided at the sensor and contacting the outer circumference of the base so that the bar code label is sensed by the sensor while being turned.

* * * * *